US012518729B2

(12) United States Patent
Askarpour

(10) Patent No.: US 12,518,729 B2
(45) Date of Patent: Jan. 6, 2026

(54) ELECTRONIC NOISE CANCELLATION TECHNIQUES FOR AIRCRAFT ENCLOSURES AND/OR OTHER ENCLOSURES

(71) Applicant: INNOVATIVE SOLUTIONS & SUPPORT, INC., Exton, PA (US)

(72) Inventor: Shahram Askarpour, Media, PA (US)

(73) Assignee: INNOVATIVE SOLUTIONS & SUPPORT, INC., Exton, PA (US)

( * ) Notice: Subject to any disclaimer, the term of this patent is extended or adjusted under 35 U.S.C. 154(b) by 262 days.

(21) Appl. No.: 18/195,051

(22) Filed: May 9, 2023

(65) Prior Publication Data
US 2023/0377551 A1 Nov. 23, 2023

Related U.S. Application Data

(60) Provisional application No. 63/407,904, filed on Sep. 19, 2022, provisional application No. 63/343,363, filed on May 18, 2022.

(51) Int. Cl.
G10K 11/178 (2006.01)
B64C 11/00 (2006.01)
F21V 33/00 (2006.01)

(52) U.S. Cl.
CPC ........ *G10K 11/17823* (2018.01); *B64C 11/00* (2013.01); *F21V 33/0056* (2013.01); *G10K 11/17873* (2018.01); *B64C 2220/00* (2013.01); *G10K 2210/1281* (2013.01); *G10K 2210/3027* (2013.01); *G10K 2210/3044* (2013.01); *G10K 2210/3046* (2013.01); *G10K 2210/504* (2013.01)

(58) Field of Classification Search
CPC ....... G10K 11/17823; G10K 11/17873; G10K 2210/1281; G10K 2210/3027; G10K 2210/3044; G10K 2210/3046; G10K 2210/504; B64C 11/00; B64C 2220/00; F21V 33/0056
USPC ........................................................ 381/71.8
See application file for complete search history.

(56) References Cited

U.S. PATENT DOCUMENTS 3,685,610 A 8/1972 Bschorr
4,947,356 A 8/1990 Elliott et al.
(Continued)

FOREIGN PATENT DOCUMENTS

WO 1990003026 3/1990

*Primary Examiner* — Vivian C Chin
*Assistant Examiner* — Douglas J Suthers
(74) *Attorney, Agent, or Firm* — Kevin Paganini, Esq.

(57) ABSTRACT

This disclosure relates to improved techniques for electronic noise cancellation in aircraft and other enclosures. In certain embodiments, an electronic noise cancellation device can be installed in an aircraft. In certain embodiments, the electronic noise cancellation device can include a housing that integrates: one or more audio input devices that are configured to receive an input audio signal; one or more audio output devices configured to output a noise cancellation signal; one or more lighting components; and at least one connector that enables the electronic noise cancellation device to be coupled to an overhead service component of the aircraft. In certain embodiments, the electronic noise cancellation device is adapted to be received in a lighting socket of the overhead service component included within an aircraft enclosure. Other embodiments are disclosed.

21 Claims, 7 Drawing Sheets

(56) References Cited

U.S. PATENT DOCUMENTS

| | | | |
|---|---|---|---|
| 5,845,236 A * | 12/1998 | Jolly | G10K 11/17861 |
| | | | 702/56 |
| 6,343,127 B1 | 1/2002 | Billoud | |
| 8,280,069 B2 | 10/2012 | Maeda et al. | |
| 9,595,253 B2 | 3/2017 | Inoue | |
| 10,176,794 B2 | 1/2019 | Tonon et al. | |
| 10,506,339 B2 | 12/2019 | Dunn et al. | |
| 11,069,333 B2 | 7/2021 | Samuelsson et al. | |
| 2009/0034746 A1* | 2/2009 | Nozaki | G10K 11/1783 |
| | | | 381/71.1 |
| 2011/0068711 A1* | 3/2011 | Spiro | F21V 23/04 |
| | | | 315/307 |
| 2013/0039020 A1* | 2/2013 | Rittner | B64D 11/0632 |
| | | | 361/740 |
| 2017/0203856 A1* | 7/2017 | Dunn | H04R 3/12 |
| 2018/0158460 A1* | 6/2018 | Lee | G10L 15/22 |
| 2020/0291964 A1 | 9/2020 | Goto et al. | |

* cited by examiner

ELECTRONIC NOISE CANCELLATION TECHNIQUES FOR AIRCRAFT ENCLOSURES AND/OR OTHER ENCLOSURES

CROSS-REFERENCE TO RELATED APPLICATIONS

This application claims benefit of, and priority to, U.S. Provisional Patent Application No. 63/343,363 filed on May 18, 2022 and U.S. Provisional Patent Application No. 63/407,904 filed on Sep. 19, 2022. The contents of the above-identified applications are herein incorporated by reference in their entireties.

TECHNICAL FIELD

This disclosure describes, inter alia, electronic noise cancellation systems that can be utilized to cancel noise within an enclosure. In some embodiments, the electronic noise cancellation systems can be installed inside aircraft and/or other vehicles to cancel noise within the interior of the vehicles. The electronic noise cancellation systems can be installed in other environments as well.

BACKGROUND

Noise cancellation technologies can be used to cancel out ambient noise. There are generally two types of noise cancellation techniques: passive noise cancellation and active noise cancellation.

Passive noise cancellation generally involves using barriers, materials, or physical designs to block audio signals from reaching an individual's ear canal. Passive noise cancellation can be applied to various types of devices and structures. For example, ear buds can be inserted into an individual's ears to block or limit noise from reaching an individual's ear canal. Likewise, sound absorbing foams can be adhered to walls (e.g., in musical or instrument settings) to block or limit noise from leaving a room.

Active noise cancellation uses electronic technologies to cancel noise. In general, this technology attempts to detect a sound pattern of incoming noise and generate a corresponding output sound to cancel out the incoming noise. A common application of this technology is applied to noise cancellation headphones.

Noise cancellation may be desirable in various settings and environments. Applying noise cancellation technologies to vehicles can be beneficial due the loud ambient noises produced by the vehicles' mechanical components during operation. For example, in many types of aircraft, the noise generated by the propellers, engines, and/or other mechanical components during operation can be heard within the aircraft cabin or interior at very loud volumes. This is particularly true for aircraft that use turboprop engine systems. While pilots often use noise cancellation headsets to filter out the ambient noise generated by the aircraft, the passengers in the cabin of the aircraft remain exposed to the noise. The noise generated by the aircraft during operation can inhibit the pilot or crewmembers from effectively conveying information to the passengers seated in the cabin of the aircraft.

Similarly, the mechanical components of other vehicles also produce loud noises during operation. For example, in automobiles, the wheels and/or engine often produce loud noises that can be heard within the passenger cabin of the automobile. Likewise, in watercraft (e.g., ships, boats, etc.), the engines, turbines, and/or other mechanical components can generate loud noises that can be heard inside of the vessel.

The effectiveness of passive noise cancellation techniques in vehicles is limited, and noises emanating from the vehicles' mechanical components can often be heard within the cabin even when noise-blocking materials are used. Additionally, in many cases, it is not practical to incorporate sufficient noise-blocking materials into vehicles due to a limited availability of space within the vehicle cabin and/or because upgrading vehicles with noise-blocking materials would require extensive time, expense and retrofitting efforts. Furthermore, incorporating an active noise cancellation system into a vehicle can be technically challenging. One technical challenge relates to avoiding feedback, which can occur when speakers or microphones associated with the active noise cancellation system are both placed within the interior of a vehicle cabin.

BRIEF DESCRIPTION OF DRAWINGS

To facilitate further description of the embodiments, the following drawings are provided, in which like references are intended to refer to like or corresponding parts, and in which.

Figure 1:
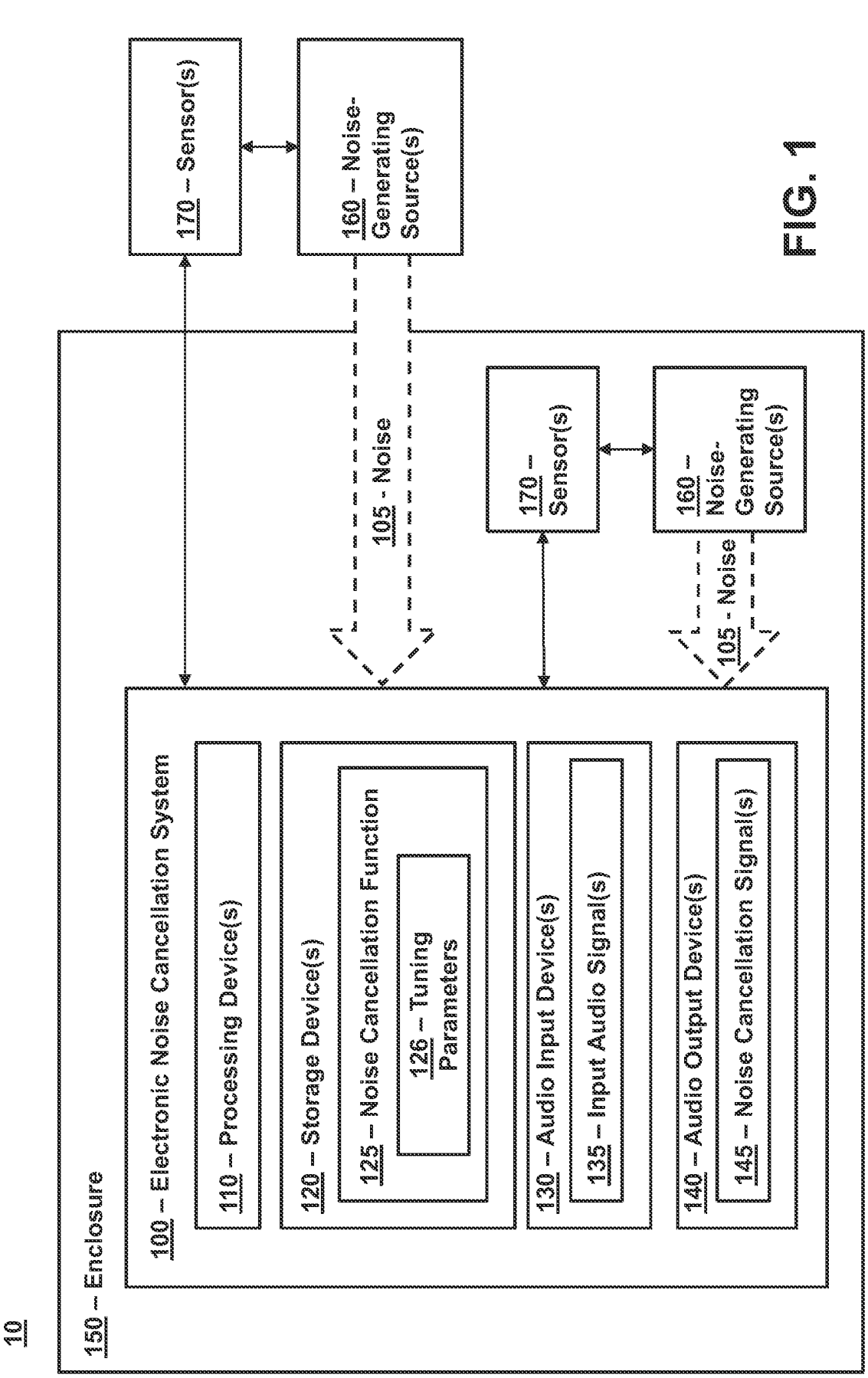
FIG. 1 is a block diagram of an electronic noise cancellation system in accordance with certain embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "connect," "connected," "connects," "connecting," "couple," "coupled," "couples," "coupling," and the like should be broadly understood and refer to linking two or more elements or signals, electrically, electronically, mechanically and/or otherwise. Connecting/coupling may be for any length of time, e.g., permanent or semi-permanent or only for an instant.

The terms "pilot," "pilots," "operator," "operators," or the like should be broadly understood to refer to any individual or user, and not necessarily to individuals who are certified to operate or fly aircraft or other vehicle.

DETAILED DESCRIPTION OF EXEMPLARY EMBODIMENTS

The present disclosure relates to systems, methods, apparatuses, and techniques for providing electronic noise cancellation. In certain embodiments, an electronic noise cancellation system can be installed within an enclosure to cancel unwanted noises using active noise cancellation technologies. For example, in certain embodiments, the electronic noise cancellation system can be installed inside an aircraft enclosure (e.g., in one or more overhead service compartments) to cancel unwanted noise originating from mechanical components of an aircraft (e.g., turboprop engines, propellers, etc.).

The electronic noise cancellation system can include one or more audio input devices and one or more audio output devices strategically placed within an enclosure, as well as one or more sensors configured to monitor parameters associated with one or more noise-generating sources. The noise-generating sources may be located outside the enclosure and/or within the enclosure. The electronic noise cancellation system can utilize the signals from the one or more sensors to generate noise cancellation signals that cancel the ambient noise within the enclosure, which originates from the noise-generating sources. The noise cancellation solutions described herein can avoid or reduce audio feedback, while permitting the one or more audio input devices and one or more audio output devices to be situated within the same enclosure.

The noise cancellation technologies discussed herein can be used in a variety of different contexts and environments. Generally speaking, the electronic noise cancellation system can be installed in any enclosure to cancel noise within the enclosure. One useful application of these technologies is in the context of vehicles. For example, the electronic noise cancellation system described herein can be installed inside of aircraft (e.g., in an aircraft cabin and/or cockpit) to cancel the noise generated by the propellers, engines, and/or other mechanical components during operation of the aircraft. This can facilitate better communications between the pilot and the passengers, and can improve the comfort of the pilot, crew, and passengers.

In another example, the electronic noise cancellation system can be installed inside of automobiles (e.g., cars, trucks, buses, and/or other land-based vehicles) to cancel the noise generated by the wheels, engines, and/or other mechanical components during operation of the automobiles. The electronic noise cancellation system can be installed in other types of vehicles as well (e.g., trains, boats, sea vessels, ships, etc.) to cancel noises generated by noise-generating sources (e.g., engines, turbines, motors, etc.).

The noise cancellation technologies also can be used in contexts unrelated to vehicles. For example, in some scenarios, the electronic noise cancellation system can be installed in a room to cancel out noises within the room (e.g., noise originating from elevators, central air conditioning units, humidifiers, fans, furnaces, boilers, water heaters, etc.). The technologies discussed herein also can be applied in other environments as well.

The electronic noise cancellation system can include at least one noise cancelling apparatus or device that is installed in an overhead service compartment (also referred to as a passenger service unit or PSU) of an aircraft. In some embodiments, each apparatus or device can include one or more audio input devices (e.g., one or more microphones), one or more audio output devices (e.g., one or more speakers), and one or more lighting components (e.g., one or more LEDs and/or other light sources). Each apparatus or device can include, or communicate with, one or more processing devices that execute a noise cancellation function, and the apparatus or device can be installable in the passenger service unit to facilitate cancellation of noise within the aircraft. For example, one or more passenger service units originally installed in an aircraft can be retrofitted with the noise cancelling apparatuses or devices described herein to enhance the functionality of the passenger service units.

The noise-cancelling device can be positioned in, or connected to, a passenger service unit in one or more configurations. In certain embodiments, the noise-cancelling device can be partially enclosed or obscured when installed in a passenger service unit. For example, a first obscured portion of the noise-cancelling device, which can be situated internally within the PSU and/or above a bottom surface of the PSU, can include, inter alia, mechanical, power, and electronic connectors for coupling the device to the PSU, a power source in the aircraft, and/or a processing device that executes a noise cancellation function. A second exposed portion of the noise-cancelling device, which can be situated external to the PSU and/or extend past the bottom surface of the PSU, can include at least one lighting component, at least one audio input device, and at least one audio output device. The second exposed portion can output a noise cancellation signal in the vicinity of the PSU, and can include a lighting switch that enables activation and deactivation of the lighting component.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

FIG. 1 is a diagram of an exemplary system 10 according to certain embodiments. The system 10 comprises an electronic noise cancellation system 100 installed inside of an enclosure 150. One or more noise-generating sources 160 may be situated outside of the enclosure 150 and/or inside of the enclosure 150. One or more sensors 170 are situated in the vicinity of, or coupled to, the one or more noise-generating sources 160. The electronic noise cancellation system 100 includes one or more processing devices 110, one or more storage devices 120, one or more audio input devices 130, and one or more audio output devices 140. The one or more storage devices 120 store instructions associated with implementing a noise cancellation function 125. All the components illustrated in FIG. 1 can be configured to communicate directly with each other and/or over a network via wired or wireless communication links, or a combination of the two.

The one or more processing devices 110 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 110 can be configured to execute any computer program instructions that are stored or included on the storage devices 120 including, but not limited to, instructions associated with executing the noise cancellation function 125.

The one or more storage devices 120 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices 120 may be physical, non-transitory mediums.

The one or more audio input devices 130 may include one or more microphones, one or more audio sensors, one or more audio cards, and/or the like. In certain embodiments, the audio input devices 130 can be configured to receive input audio signals 135 (e.g., analog audio signals) within the enclosure 150, and convert the analog signals to digital audio signals (e.g., using an analog-to-digital converter). The input audio signals 135 captured by the audio input devices 130 can include noise 105 that originates from the one or more noise-generating sources 160, as well other ambient noise within the enclosure 150. As explained in further detail below, the one or more processing devices 110 can execute the noise cancellation function 125 to generate noise cancellation signals 145 that cancel out the noise 105 originating from the one or more noise-generating sources 160.

The one or more audio output devices 140 may include one or more speakers, one or more sound cards, and/or the like. The one or more audio output devices 140 can be configured to output the noise cancellation signals 145 that are generated using the noise cancellation function 125. As mentioned above, the noise cancellation signals 145 can be output within the enclosure 150 to cancel out the noise 105 inside of the enclosure 150 which originates from the one or more noise-generating sources 160.

In certain embodiments, the noise cancellation function 125 is configured to detect or determine a frequency and/or phase of the unwanted noise 105 captured in the input audio signals 135, and to generate an output audio signal that is phase-inverted by approximately one hundred and eighty degrees relative to the unwanted noise 105. This phase-inverted signal can be output as a noise cancellation signal 145 that serves to cancel out the unwanted noise 105 within the enclosure 150.

In certain embodiments, one or more sensors 170 situated in the vicinity of, or coupled to, a noise-generating source 160 can be configured to monitor various tuning parameters 126 associated with the noise-generating source 160, and relay this information to the electronic noise cancellation system 100. The nose cancellation function 125 can utilize the tuning parameters 126 to generate the noise cancellation signals 145 with greater precision and accuracy.

The types of sensors 170 (and types of tuning parameters 126 monitored by the sensors 170) can vary based on the environment in which noise cancellation is desired and/or based on the types of noise-generating sources 160. Exemplary sensors 170 that can be utilized to monitor a noise-generating source 160 and/or derive associated tuning parameters 126 can include one or more speed sensors, one or more touch sensors, one or more pressure sensors, one or more infrared (IR) sensors, one or more proximity sensors, one or more audio sensors, one or more piezoelectric sensors, and/or other types of sensors. In certain embodiments (e.g., such as those in which the electronic noise cancellation system 100 is installed within a vehicle cabin or enclosure), the sensors 170 can be coupled to, or located near, mechanical components of the vehicle. In these scenarios, the sensors 170 may include one or more propeller-mounted sensors, one or more engine-mounted sensors, one or more wheel-mounted sensors, etc.

In some embodiments, each sensor 170 can be configured to detect or monitor the frequency and/or phase of a noise-generating source 160. This frequency and/or phase information can represent (or be used to derive) tuning parameters 126 that are utilized by the noise cancellation function 125 to generate noise cancellation signals 145. For example, the noise cancellation function 125 can utilize the tuning parameters 126 to accurately identify the noise 105 in the input audio signals 135 originating from the noise-generating source 160 and/or to generate phase-inverted output signals that can cancel out the noise 105.

In some cases, the noise cancellation function 125 can be preprogrammed or calibrated to identify and cancel particular frequency bands that are prevalent for particular types of noise-generating sources 160. For example, the noise 105 originating from a known noise-generating source 160 may be monitored to determine frequency bands that are attributable to the noise-generating source 160. In this scenario, the noise cancellation function 125 can be preprogrammed to be more sensitive to the particular frequency bands that are associated with the noise-generating source 160. This predisposition to particular frequency bands can be used in combination with the tuning parameters 126 to execute the noise cancellation function 125 with greater accuracy and precision.

The techniques described herein can be used to cancel noise 105 within various types of enclosures 150. In some scenarios described herein, the enclosure 150 may represent a cabin, housing, or interior of a vehicle (e.g., such as an aircraft housing or interior and/or an automobile housing or interior). Additionally, or alternatively, the enclosure 150 can represent a room in a residential or commercial building.

The techniques described herein can be applied to other types of enclosures 150 as well.

The description below provides additional details regarding particular use cases of the electronic noise cancellation system 100 within various types of systems and enclosures.

Figure 2:
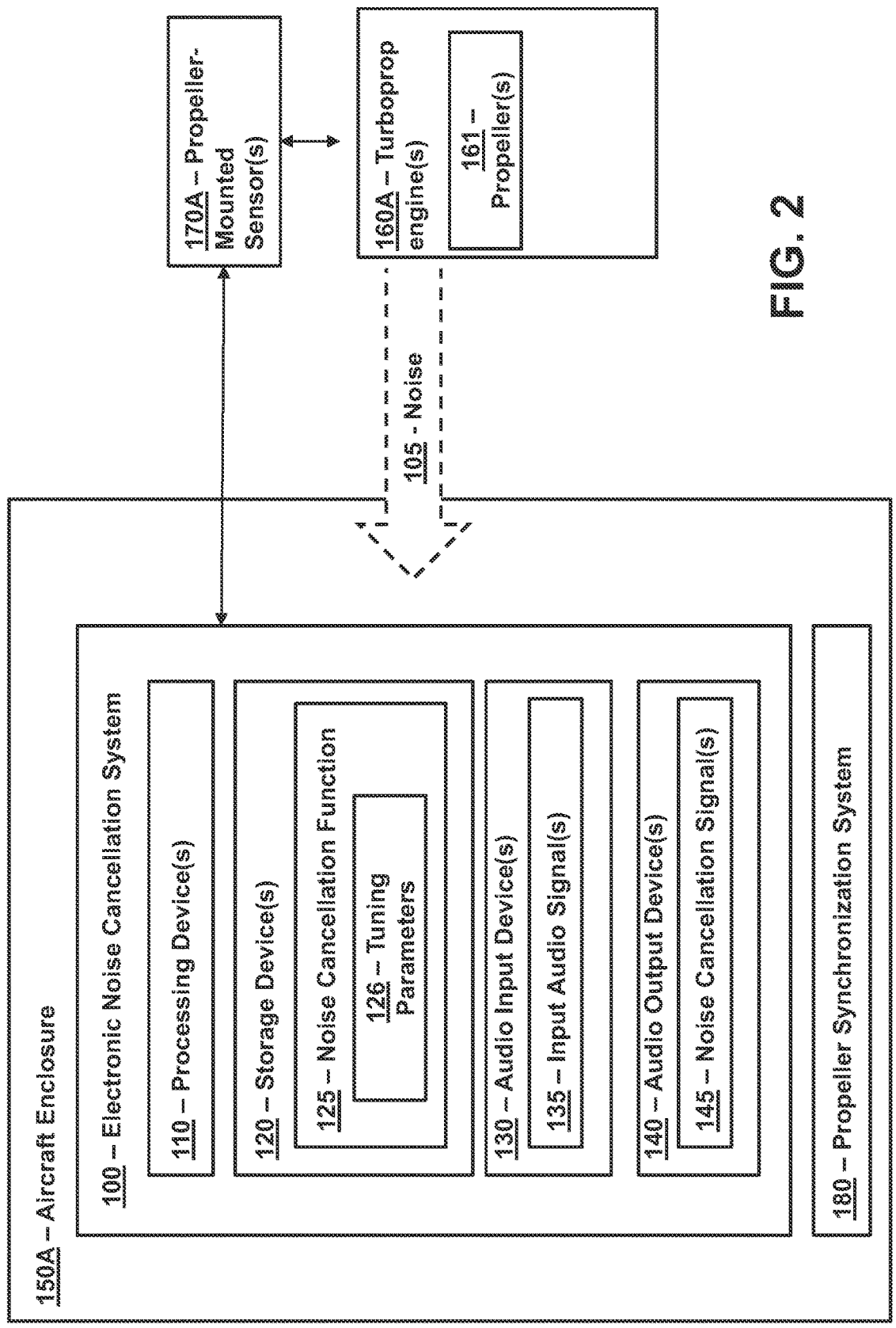
FIG. 2 is a block diagram of an electronic noise cancellation system installed in an aircraft according with certain embodiments.

FIG. 2 is a block diagram of an electronic noise cancellation system 100 installed in an aircraft enclosure 150A in accordance with certain embodiments. In this exemplary system, the electronic noise cancellation system 100 is installed inside of an aircraft that includes one or more turboprop engines 160A, each of which produces ambient noise 105 that can be heard within the aircraft enclosure 150A. Each turboprop engine 160A can include a turbine engine that drives an aircraft propeller 161. Examples of aircraft that include turboprop engines 160A include the Beechcraft King Air and Pilatus PC-12. In these and other aircraft, the frequency of the aircraft propeller(s) 161 is a major contributor to noise 105 within the aircraft enclosure 150A.

One or more propeller-mounted sensors 170A can be coupled to or near each turboprop engine 160A to monitor turning parameters 126 associated with the turboprop engine 160A. For example, in some cases, the propeller-mounted sensor 170A can include a speed sensor, or other sensor, that is configured to monitor the frequency and/or phase of a propeller 161 that is driven by the turboprop engine 160A. The propellers 161 (and turboprop engine 160A) represent noise-generating sources 160 that produce unwanted noise 105 that can be heard within the aircraft enclosure 150A. The frequency, phase, and/or other tuning parameters 126 monitored by the one or more propeller-mounted sensors 170A can be received by the noise cancellation function 125 along with input audio signals 135 that are collected by one or more audio input devices 130 within the aircraft enclosure 150A. The noise cancellation function 125 may utilize the tuning parameters 126 to identify the unwanted noise 105 in the input audio signals 135 that originates from the propeller 161 (and/or turboprop engine 160A). The noise cancellation function 125 also may utilize the tuning parameters 126 to generate phase-inverted signals that can be output as noise cancellation signals 145 to cancel out the unwanted noise 105 inside the aircraft enclosure 150A. Using the tuning parameters 126 to adjust or tune the noise cancellation signals 145 output by the audio output devices 140 can serve to eliminate or reduce audio feedback.

In some embodiments, the aircraft may be equipped with a propeller synchronization system 180. Amongst other things, the propeller synchronization system 180 can be configured to monitor the speed or frequency of propellers 161 (or corresponding engines) included in a multi-engine propeller system, and adjust the speed or frequency of the propellers 161 (or corresponding engines) so that they all rotate at the same speed. The propeller synchronization system 180 can include one or more pre-installed propeller-mounted sensors 170A that monitor the frequency and/or phase of the propellers 161 and/or corresponding engines that drive the propellers 161. In this scenario, the tuning parameters 126 may be retrieved from the propeller synchronization system 180. In other embodiments, the electronic noise cancellation system 100 can be interfaced directly with the one or more propeller-mounted sensors 170A, and can retrieve the tuning parameters 126 directly from the sensors.

In some embodiments, the noise cancellation function 125 can be preprogrammed or pre-calibrated to detect and cancel frequency bands that are prevalent in particular types of aircraft and/or commonly associated with particular types of aircraft mechanical systems (e.g., particular types of turboprop engines 160A and/or propellers 161). For example, during a calibration phase, the noise cancellation function 125 can monitor and determine frequency bands for a particular aircraft type in which the noise cancellation system 100 will be installed. This can help the noise cancellation function 125 to be customized or tuned to the frequency bands associated with that specific aircraft and/or specific type of aircraft.

It should be noted that the noise cancellation techniques described herein can be applied to any type of aircraft and are not limited to turboprop aircraft. Additionally, the noise cancellation techniques can be applied to cancel noise originating from various types of noise-generating sources 160 that may be located inside or outside of the aircraft enclosures 150A, and these techniques are not limited to cancellation of noise 105 originating from propellers 161 and/or turboprop engines 160A. For example, in some cases, one or more sensors 170 can be coupled to or near other exterior mechanical components (such as other types of engines or the like) to cancel noise 105 inside an aircraft enclosure 150A originating from the exterior mechanical components. Similarly, one or more sensors 170 can be coupled to or near interior mechanical components (e.g., landing gear, air condition units, etc.) to cancel noise 105 originating from these interior mechanical components.

Furthermore, the electronic noise cancellation system 100 can be installed in various portions of an aircraft's interior. In some cases, the noise cancellation system 100 (including associated audio input devices 130 and audio output devices 140) can be integrated into the walls and/or ceiling portions of an aircraft enclosure 150A. The electronic noise cancellation system 100 additionally, or alternatively, can be integrated into one or more passenger seats included in an aircraft enclosure 150A. The electronic noise cancellation system 100 additionally, or alternatively, can be integrated at or near flight attendant service stations included in an aircraft enclosure 150A. The description below describes an example demonstrating how the electronic noise cancellation system 100 can be integrated into one or more overhead service components or passenger service units of an aircraft.

Figure 3:
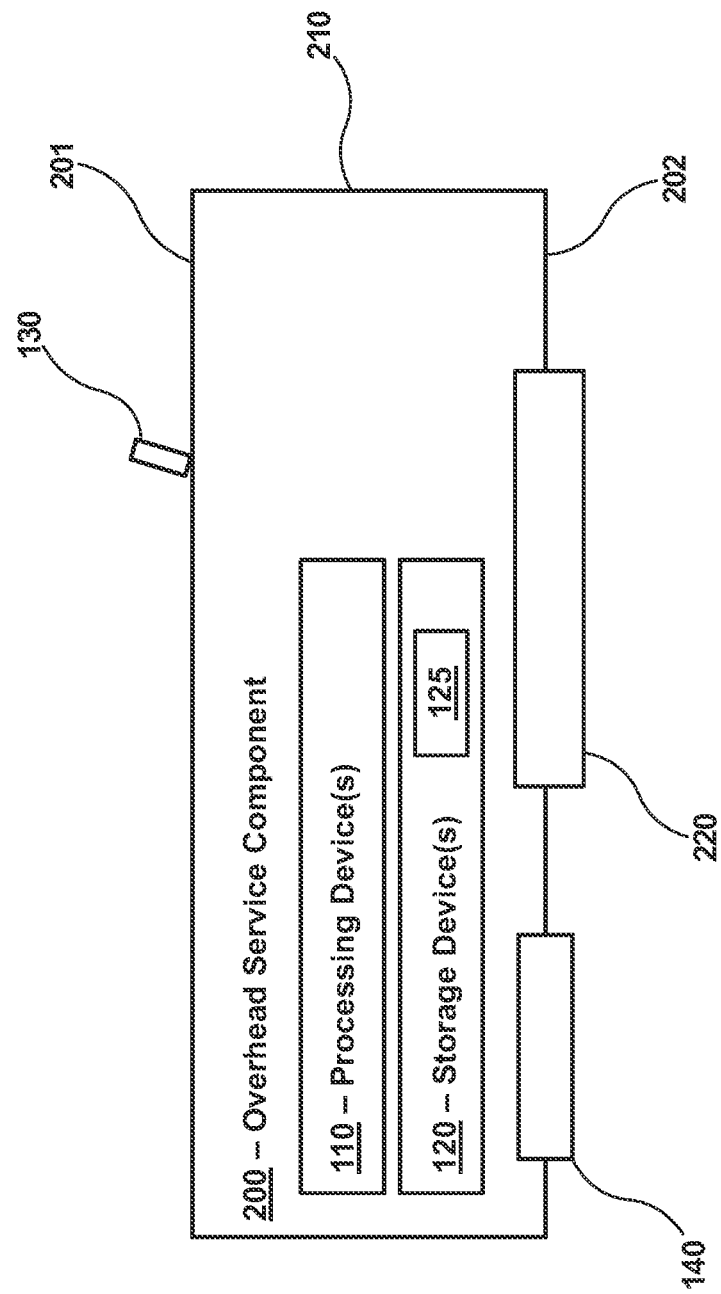
FIG. 3 is a block diagram of an overhead service component for an aircraft according with certain embodiments.

FIG. 3 is a block diagram demonstrating how an electronic noise cancellation system 100 can be integrated into one or more overhead service components 200 (also referred to as passenger service units or PSUs 200) of an aircraft in accordance with certain embodiments.

Various aircraft include overhead service components 200 located above passenger seats in an aircraft cabin. The overhead service components 200 can provide passengers with various passenger amenities 220, such as lighting components, air conditioning vents, buttons to request flight attendant assistance, deployable oxygen masks, illuminated signs (e.g., seatbelt signs or no smoking signs), and/or loudspeakers to relay announcements. As described below, a noise cancellation system 100 can be integrated into one or more overhead service components 200 included in an aircraft enclosure 150A. In some scenarios, the overhead service components 200 can be installed to replace traditional passenger service units (or can be retrofitted to include the noise cancellation system 100 described herein) and upgrade an aircraft with noise cancellation functionalities.

In certain embodiments, an overhead service component 200 can include a housing 210 that comprises a top surface 201 and a bottom surface 202. The bottom surface 202 can face the floor of an aircraft (e.g., face downwards towards passengers). The bottom surface 202 can include the passenger amenities 220 and one or more audio output devices 140 (e.g., speakers) that are configured to output noise cancellation signals 145, as well as other audio output signals (e.g., announcements by pilots or crewmembers). The top surface 201 can face upward towards the ceiling of the aircraft and may not be visible to passengers when the overhead service component 200 is installed. The top surface 201 can include one or more audio input devices 130 (e.g., microphones).

The one or more audio output devices 140 situated on the bottom surface 202 of the housing 210 can output noise cancellation signals 145 generated by the noise cancellation system 100. The one or more audio input devices 130 situated on the top surface 201 can receive input audio signals 135, which can include unwanted noise 105 originating from one or more noise-generating sources 160 (e.g., propellers, engines, landing gear, air condition units, etc.). The one or more noise-generating sources 160 may be situated exterior to an aircraft enclosure 150A and/or inside of an aircraft enclosure 150A. In some scenarios, the housing 210 separates the one or more audio output devices 140 situated on the bottom surface 202 from the one or more audio input devices 130 situated on the top surface 201, which can be helpful to reduce audio feedback.

To further assist with reducing feedback, the one or more audio input devices 130 can be situated at specified or predetermined angles relative to the one or more audio output devices 140. In some cases, an audio input device 130 on the top surface 201 can be faced upward on the top surface 201 at an angle that is ninety degrees or more (e.g., 90 degrees, 120 degrees, 150 degrees, or 180 degrees) relative to an audio output device 140 that is facing downwards on the bottom surface 202. Situating the audio input device 130 and audio output device 140 in this manner can help to reduce feedback, and improve performance of the noise cancellation function 125.

In some embodiments, each overhead service component 200 can include a standalone electronic noise cancellation system 100 that independently executes a noise cancellation function 125. In this scenario, each overhead service component 200 can include a processing device 110 that separately executes a noise cancellation function 125 (e.g., which may be stored on a storage device 120) using tuning parameters 126 that are obtained from one or more sensors 170.

In other embodiments, a plurality of overhead service components 200 can be networked and/or coupled to a centralized processing device 110 that executes a noise cancellation function 125. In this scenario, each of the plurality of overhead service components 200 may include an audio input device 130 and an audio output device 140 that are in communication with the centralized processing device 110. The centralized processing device 110 can receive the input audio signals 135 collected by the audio input devices 130, as well as the tuning parameters 126 collected by one or more sensors 170 (e.g., propeller-mounted sensors 170A). The centralized processing device 110 utilizes this information to generate noise cancellation signals 145, which can be relayed to the plurality of audio output devices 140 to cancel noise 105 within the aircraft interior.

Figure 4:
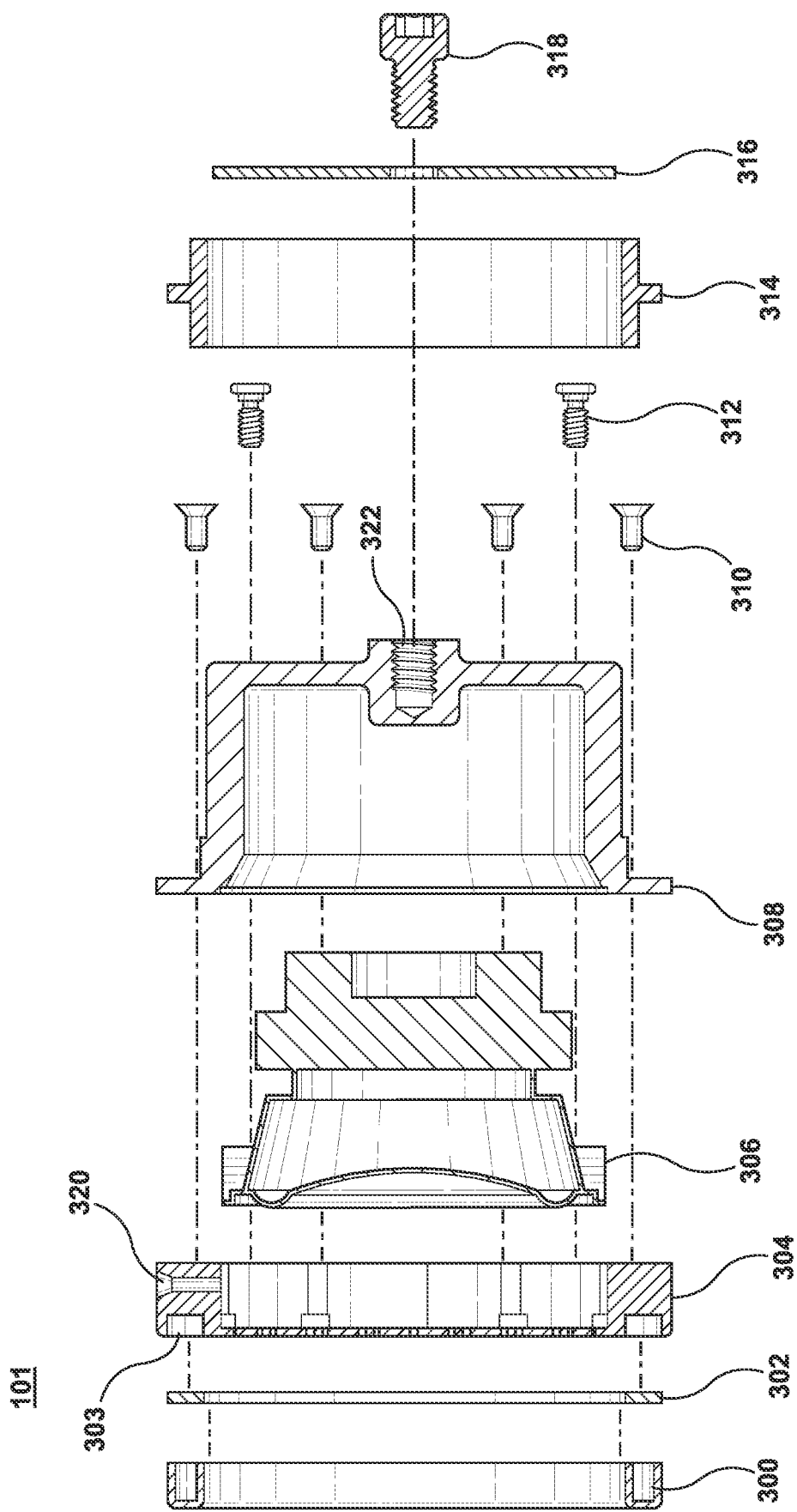
FIG. 4 is an exploded view of an electronic noise cancellation device in accordance with certain embodiments.
Figure 5:
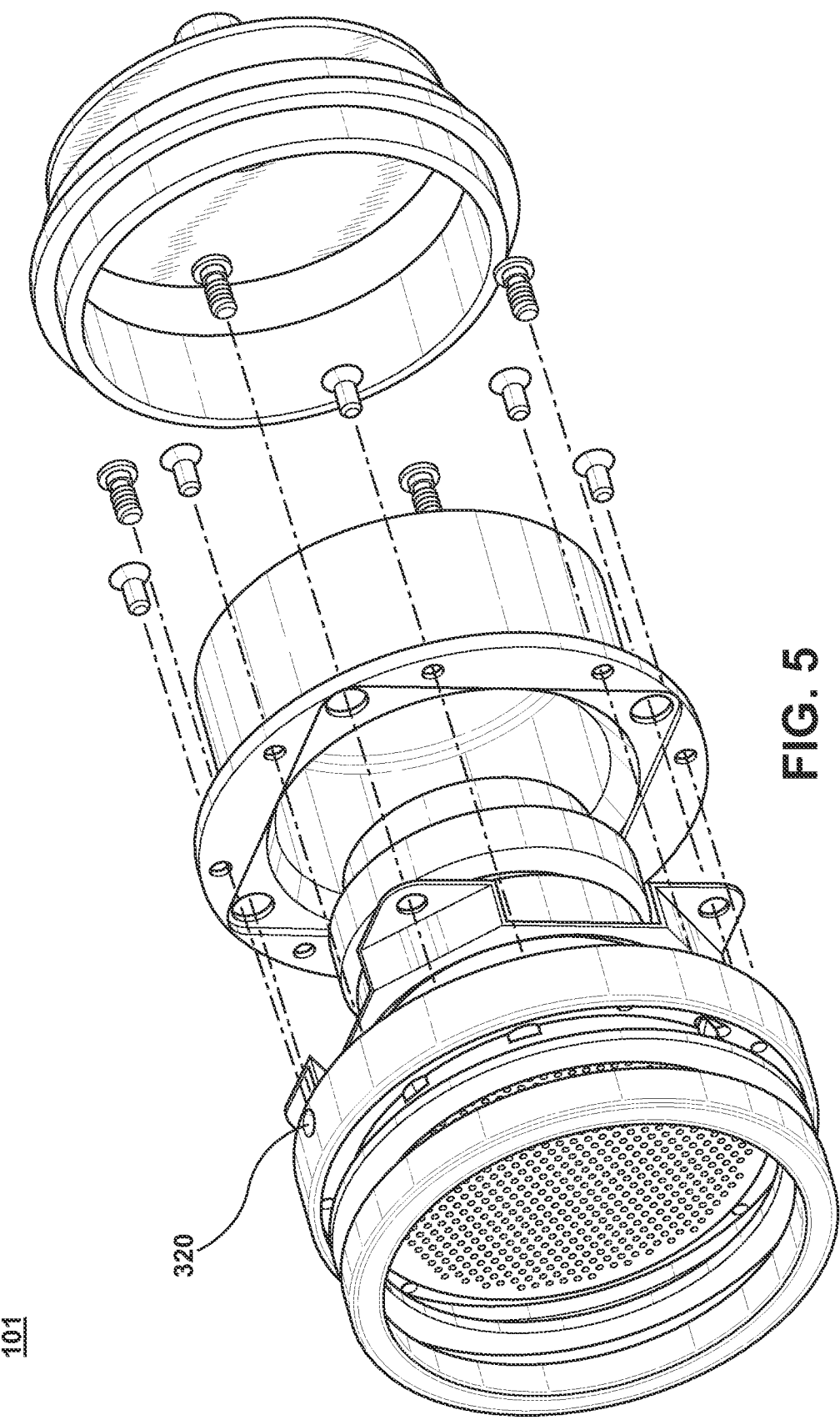
FIG. 5 is an alternate view of the electronic noise cancellation device in accordance with certain embodiments.
Figure 6B:
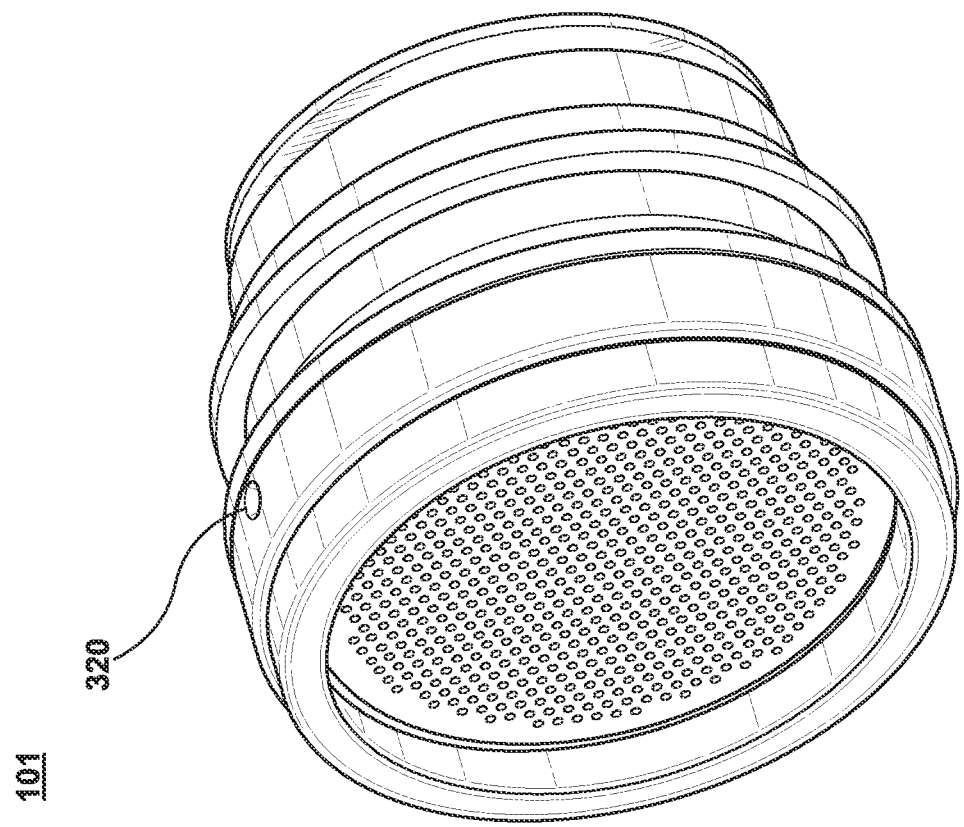
FIG. 6B is an alternate view of the electronic noise cancellation device in accordance with certain embodiments.
Figure 6A:
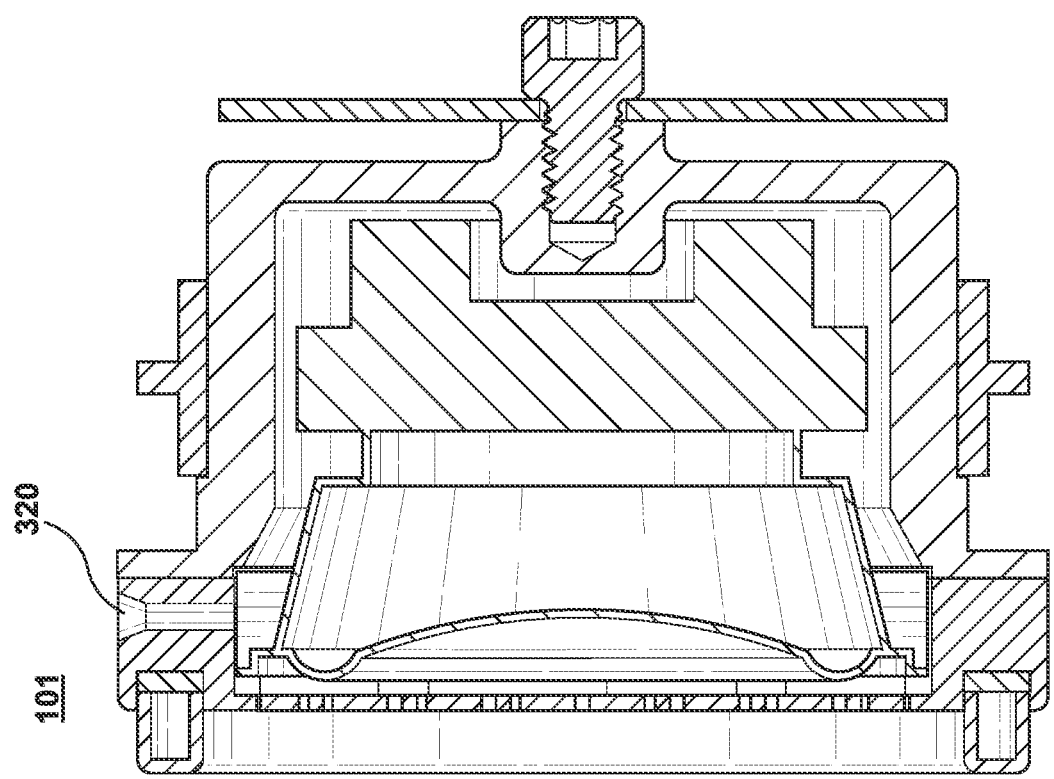
FIG. 6A is an alternate view of the electronic noise cancellation device in accordance with certain embodiments.

FIGS. 4-5 and 6A-6B disclose an exemplary noise cancellation device 101 that can be included in the noise cancellation system 100 according to certain embodiments. FIGS. 4 and 5 are exploded views of the noise cancellation device 101 according to certain embodiments. FIGS. 6A and 6B illustrate the noise cancellation device 101 in an assembled configuration according to certain embodiments.

The noise cancellation device 101 can be incorporated into one or more overhead service components 200 inside an aircraft enclosure 150A to upgrade the overhead service components 200 with active noise cancellation technologies. For example, the noise cancellation device 101 can be configured to replace traditional lighting components included in originally manufactured overhead service components 200. The noise cancellation device 101 can generate or output noise cancellation signals 145 in the same manner described above. For example, the noise cancellation device 101 can communicate with, or include, one or more processing devices 110 that generate noise cancellation signals in the same manner as described herein (e.g., using the tuning parameters 126, sensor outputs, propeller synchronization system outputs, etc.), and the noise cancellation device 101 can output these noise cancellation signals directly in the vicinity of the PSU. In addition to providing noise cancellation functionalities, the noise cancellation device 101 also can provide lighting components that emit light in the vicinity of an underlying passenger seat.

The exemplary electronic noise cancellation device 101 includes an light emitting diode (LED) diffuser 300, an LED printed wiring board (PWB) 302, a microphone 303 a microphone bezel 304, a speaker 306, a speaker housing 308, first fasteners 310, second fasteners 312, an aircraft collar 314, a speaker PWB 316, a third fastener 318, and a PSU connector 322. As explained below, these components can be integrated or connected to form a housing for the electronic noise cancellation device 101.

In some embodiments, the electronic noise cancellation device 101 can include more than one of some or all of the aforementioned components. Additionally, in some embodiments, one or more of these components illustrated in FIGS. 4-5 and 6A-6B can be excluded from the noise cancellation device 101 or removed from the noise cancellation device 101. Alternative components (e.g., alternative types of lighting sources or fastening means) also be used instead of the specific components illustrated in these figures. The noise cancellation device 101 also can be equipped with additional components that are not illustrated. For example, in some scenarios, can additionally include one or more processing devices 110, one or more storage devices 120, and/or additional components associated with providing other types of passenger amenities 220 described herein.

The electronic noise cancellation device 101 can be connected to, and powered by, an existing power system in an aircraft. For example, in some cases, the electronic noise cancellation device 101 can be powered by an electrical connection in or near an overhead service component 200 (e.g., an electrical connection that was previously used to power an original lighting component included in the overhead service component 200).

To assemble the exemplary noise cancellation device 101 illustrated in FIGS. 4-5 and 6A-6B, the speaker 306 can be positioned in the speaker housing 308 and the second fasteners 312 can serve to couple the speaker 306 to the speaker housing 308. In some embodiments, the second fasteners 312 can correspond to speaker mount screws. However, the second fasteners 312 can be any type of fastening or coupling means (e.g., snap fit connectors, press fit connectors, etc.). The aircraft collar 314 can be positioned over the speaker housing 308, and the speaker PWB 316 can be coupled to the speaker 306 and the speaker housing 308 using the one or more third fasteners 318. In some embodiments, the third fasteners 318 can correspond to speaker PWB screws that are received by the PSU connector 322, which can represent a threaded insert in some cases.

The LED PWB 302 can be positioned within the microphone bezel 304, and the LED diffuser 300 can be positioned on the LED PWB 302 and coupled to the microphone bezel 304. The microphone bezel 304 can be coupled to the speaker housing 308 using the first fasteners 310. In some embodiments, the first fasteners 310 can correspond to flat head cap screws. It should be recognized that the screws (310, 312, 318) and threaded insert associated with the PSU connector 322 can be replaced with other types of mechanical connectors.

The one or more third screws 318 (or other type of connectors) also can be used to couple the noise cancellation device 101 to an overhead service component 200. For example, in some scenarios, the one or more third screws 318 can be inserted through one or more openings or holes included in an overhead service component 200 to attach or couple noise cancellation device 101 to the overhead service component 200.

The noise cancellation device 101 can be mounted in the overhead service component 200 to output noise cancellation signals 145 generated by a noise cancellation function 125. For example, the noise cancellation device 101 can be coupled to the overhead service component 200 using the aircraft collar 314 and/or the one or more third screws 318. In some embodiments, the noise cancellation device 101 can be designed and dimensioned to fit inside of lighting socket of a traditional overhead service component 200. In such scenarios, the existing lighting components (e.g., those originally incorporated in the PSU when manufactured or installed) included in a traditional overhead service component can be removed and replaced with the noise cancellation device 101. The connectors (e.g., the one or more third screws 318) used to couple the noise cancellation device 101 to the PSU can be the same connectors utilized to connect the lighting components, and the noise cancellation device 101 can be connectable to the same power source that is utilized by the traditional lighting components.

The manner in which the noise cancellation signals 145 are generated and/or output by the noise cancellation device 101 can vary. In some cases, a microphone included in the noise cancellation device 101 monitors ambient noise within an aircraft cabin and/or in the vicinity of a passenger seat, and a noise cancellation function 125 generates corresponding noise cancellation signals 145 to cancel out the ambient noise. The noise cancellation function 125 can be executed by the noise cancellation device 101 itself (e.g., by a processing device 110 integrated within the noise cancellation device 101) or the noise cancellation function 125 can be executed by processing device in a communication with the noise cancellation device 101 (e.g., such as a centralized processing device that is in communication with a plurality of noise cancellation devices 101). For example, a plurality of noise cancellation devices 101 included in an aircraft enclosure 150A can be networked with, or connected to, a centralized processing device that executes a noise cancellation function 125. Regardless of whether the noise cancellation signals 145 are generated locally by the noise cancellation devices 101 or remotely by the centralized processing device, the noise cancellation signals 145 can be output by a speaker included on each of the noise cancellation devices 101.

In certain embodiments, the noise cancellation device 101 can communicate directly or indirectly with the other components of the noise cancellation system 100 described above (e.g., such as sensors 170, propeller-mounted sensors 170A, propeller synchronization system 180, etc.). As explained above, the noise cancellation device 101 (or processing device 110 in communication with the noise cancellation device 101) can utilize the tuning parameters 126 obtained or derived from the sensors 170 and/or propeller synchronization system 180 to enhance performance of the noise cancellation function 125. For example, in some cases, the tuning parameters 126 can assist with cancelling noise originating from specific noise-generating sources 160 (e.g., turboprop engines 160A, propellers 161, etc.) associated with an aircraft, and the noise cancellation signals 145 can be output via the speakers 306 included in the noise cancellation devices 101.

The noise cancellation device 101 can be calibrated or preprogrammed to identify and cancel particular frequency bands that are prevalent for particular types of noise-generating sources 160 and/or prevalent for particular types of aircraft in the same manner described throughout this disclosure. For example, in certain embodiments, a component of the noise cancellation device 101 (e.g., the LED diffuser 300) can be rotatable to adjust light settings, and this component also can be utilized to activate a calibration mode for the noise cancellation device 101 (e.g., by rotating the component an additional time). As explained above, when the calibration mode is activated, the noise cancellation function 125 can monitor and identify prevalent frequency bands for a particular aircraft type in which the noise cancellation device 101 is installed, and the noise cancellation device 101 can be programmed to detect the identified frequency bands when the noise cancellation device 101 is operating in a normal operational mode.

Figure 7B:
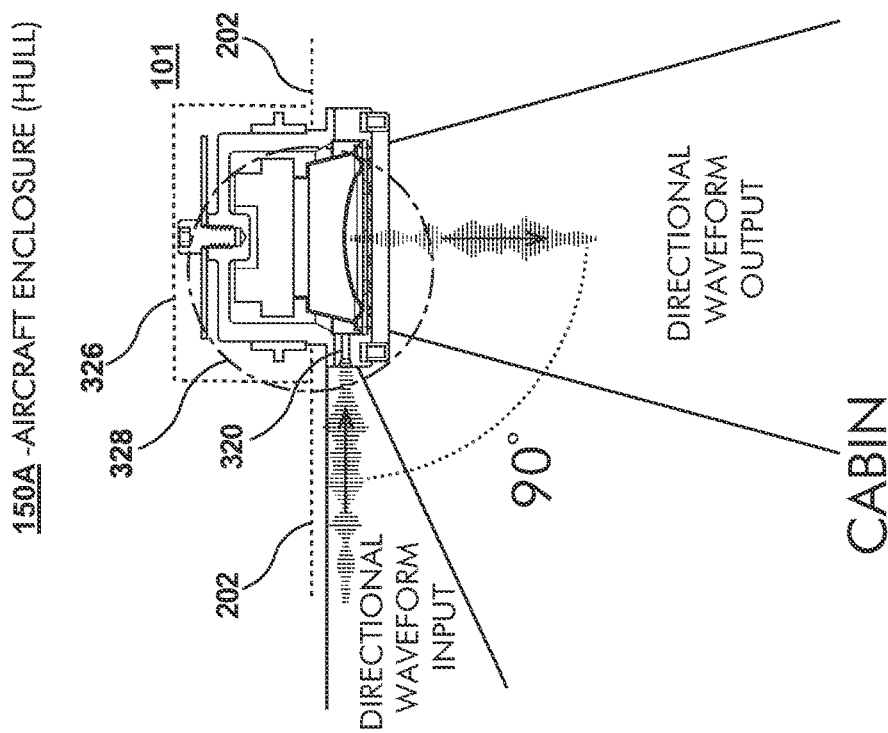
FIG. 7B is an alternate view of the electronic noise cancellation device installed in an aircraft in accordance with certain embodiments.
Figure 7A:
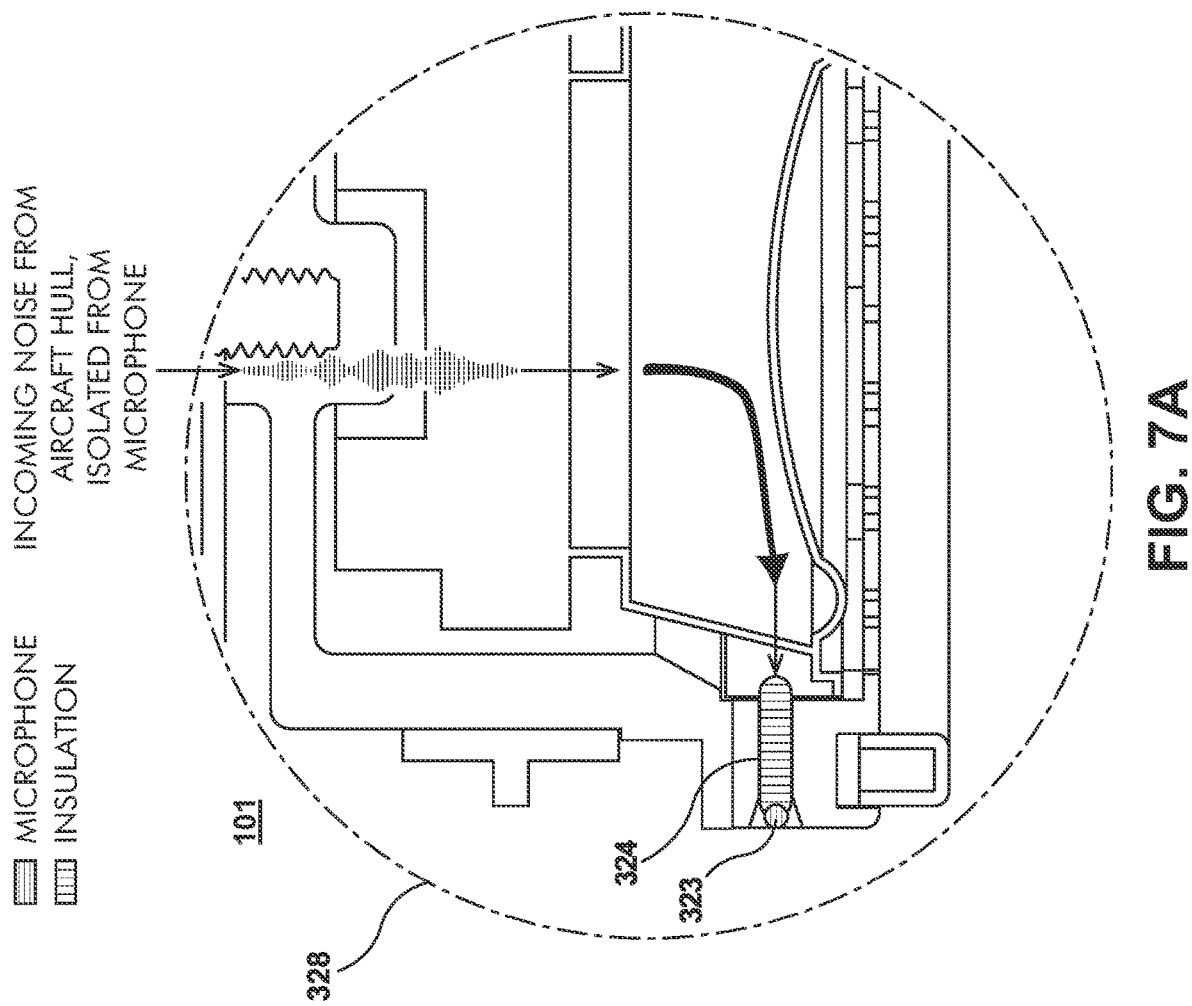
FIG. 7A is a view of the electronic noise cancellation device installed in an aircraft in accordance with certain embodiments.

Turning to FIGS. 7A and 7B, the noise cancellation device 101 is illustrated as installed in a lighting socket 326 to replace a lighting apparatus of the overhead service component 200. FIG. 7A illustrates an isolated view of a section 328 of the noise cancellation device 101 as installed in the lighting socket 326. In the illustrated embodiments, the microphone bezel 304 includes an opening 320 that houses a microphone 323 and insulation 324. The insulation 324 is positioned in the opening to mitigate incoming noise (e.g., emanating from the aircraft hull) from reaching the microphone 323. The opening 320 permits noise and/or directional waveform inputs within an aircraft cabin to reach the microphone 323. Consistent with the above discussion in connection with FIGS. 1-3, directional waveform inputs are received by the microphone 323 and directional waveform outputs (e.g., noise cancellation signals 145) are output by the speaker 306 of the noise cancellation device 101 to cancel noise in a passenger cabin (e.g., in the vicinity of a passenger seat situated below the noise cancellation device 101). In this example, the microphone 323 is orientated at an angle that is ninety degrees from the output of the speaker 306 (e.g., ninety degrees from the direction of the directional waveform outputs). This arrangement serves to eliminate, or at least mitigate, the occurrence of audio feedback.

As mentioned above, in addition to providing noise cancellation functions, the noise cancellation device 101 also can include one or more lighting components (e.g., LEDs) that provide lighting functions.

The LED PWB 302 includes or is connected to at least one LED (or other type of lighting component) that is configured to emit light in a downward direction in the direction of a passenger seat. The LED diffusor 300 can execute functions associated with evenly spreading or distributing the light output by the LEDs incorporated into the noise cancellation device 101. In some embodiments, the LED diffusor 300 can be rotatable to adjust lighting settings. For example, an individual can rotate the LED diffusor 300 around the microphone bezel 304 to turn on, dim, and turn off the LEDs. In other embodiments, the noise cancellation device 101 can be configured to adjust the lighting settings in other ways (e.g., using switches, buttons, etc.).

In some embodiments, the noise cancellation device 101 can be partially enclosed by the overhead service component 200 when the noise cancellation device 101 is installed in the overhead service component 200. For example, a first portion can be positioned within the overhead service component 200 and/or extend above the bottom surface 202 of the overhead service component 200, and a second portion can be positioned external to the overhead service component 200 and/or extend below bottom surface 202.

As illustrated in FIG. 7B, the noise cancellation device 101 is partially enclosed by the lighting socket 326. In the illustrated embodiment, the speaker housing 308, the aircraft collar 314, and the speaker PWB 316 are positioned on a first side of the bottom surface 202 of the housing 210 (i.e., internal to the lighting socket 326). Also in the illustrated embodiment, the LED diffuser 300, the LED PWB 302, the microphone 303, the microphone bezel 304, and a portion of the speaker 306 are positioned on a second side of the bottom surface 202 of the housing 210 (i.e., external to the lighting socket 326). This enables an individual to operate the noise cancelation device 101.

In some embodiments, the first portion can include the speaker housing 308, the aircraft collar 314, the speaker PWB 316, and an upper portion of an audio output device 140 (e.g., speaker 306). The first portion also can include one or more mechanical connectors for coupling the noise cancellation device 101 to the overhead service component 200, as well as connectors for powering the noise cancellation device 101 and connecting the noise cancellation device 101 to one or more processing devices 110 that generate the noise cancellation signals.

In some embodiments, the second portion of the noise cancellation device 101 can include one or more lighting components (e.g., the LED diffuser 300, the LED PWB 302, and/or other lighting components), and or more audio input devices 130 (e.g., the microphone 303), the microphone bezel 304, and a lower portion of the audio output device 140 (e.g., speaker 306). The second portion can be exposed above a passenger seat and can enable a passenger to manipulate the noise cancellation device 101 (e.g., activate/deactivate the noise cancellation device 101, control settings of the lighting components, etc.). For example, in some embodiments, a passenger can enable an individual to rotate the LED diffusor 300 around the microphone bezel 304 to turn on, dim, and turn off the LEDs.

Positioning the second portion of the noise cancellation device 101 external to the overhead service component 200 enables the audio input device 130 (e.g., microphone 323) in the opening 320 to receive noise and/or directional waveform inputs within an aircraft cabin. The directional waveform inputs received by the audio input device 130 can be transmitted to the processing device 110 for analysis, and the processing device 110 can generate and transmit directional waveform outputs (e.g., noise cancellation signals 145) to the audio output device 140 (e.g., speaker 306), which can output these signals to cancel noise in a passenger cabin (e.g., in the vicinity of a passenger seat situated below the noise cancellation device 101). Positioning a portion of the speaker 306 of the noise cancellation device 101 external to the overhead service component 200 mitigates obstructions from interfering with the directional waveform outputs.

The above-described noise cancellation device provides a variety of advantages and benefits. Amongst other things, it provides a compact device that is able to cancel unwanted noise inside the cabin of an aircraft. Also, in some embodiments, the noise cancellation signals output by the noise cancellation device are able to more effectively cancel unwanted noise in an aircraft cabin using improved noise cancellation techniques (e.g., using the tuning parameters, sensor outputs, propeller synchronization system outputs, and/or calibration techniques described herein). Additionally, the configuration of the device allows it to replace existing lighting components in a traditional PSU, and to upgrade a traditional PSU to include noise cancellation technologies. Further, the configuration of the noise cancellation device (e.g. such as the location and orientation of the microphone, speaker, and insulation) when installed in the PSU shields the device from noise emanating from hull and reduces audio feedback.

The electronic noise cancellation systems 100 described herein can be incorporated into aircraft in other ways than those explicitly mentioned herein.

In some embodiments, an electronic noise cancellation system 100 can be coupled to an output interface that permits a user to view data related to the noise cancellation functions and/or control aspects of the electronic noise cancellation system 100. In some cases, the output interface may be included in a cockpit or in a flight attendant section of an aircraft. In other scenarios, the output interface may be included on or near a dashboard of an automobile. In further scenarios, the output interface may be included in a control room of a residential or commercial building.

The output interface can include one or more light-emitting diode (LED) displays, one or more liquid crystal displays (LCDs), one or more cathode ray tube (CRT) displays, and/or other types of displays. The output interfaces also can include selectable options (e.g., buttons, dials, capacitive touch-screens, switches, etc.) that enable pilots, automobile operators, and/or other individuals to make selections.

The output interface can enable an individual to perform various functions including: activating and deactivating the electronic noise cancellation system 100; view tuning parameters and/or other metrics associated with executing the noise cancellation functions; adjusting or customizing the tuning parameters and/or the other metrics; and/or viewing parameters related to ambient noises in an enclosure.

As mentioned above, the techniques and solutions described in this disclosure can applied to any type of aircraft (e.g., commercial airplanes, military airplanes, helicopters, air ships, etc.). The techniques also can be applied to other types of vehicles (e.g., land-based vehicles, water-based vehicles, etc.) and/or other types of enclosures (e.g., rooms or buildings). Appropriate adaptations or modifications can be incorporated to tailor these techniques and solutions to particular types of aircraft, vehicles, and/or enclosures.

In certain embodiments, an electronic noise cancellation device for an aircraft is provided. The electronic noise cancellation device comprises: a housing that integrates: one or more audio input devices that are configured to receive an input audio signal; one or more audio output devices configured to output a noise cancellation signal; one or more lighting components; and at least one connector that enables the electronic noise cancellation device to be coupled to an overhead service component of the aircraft; wherein the electronic noise cancellation device is adapted to be received in a lighting socket of the overhead service component included within an aircraft enclosure.

In some embodiments, the electronic noise cancellation device is adapted to replace a lighting component of the overhead service component and upgrade the overhead service component with noise cancellation functionalities; the electronic noise cancellation device is sized to fit inside the lighting socket based on dimensions of the lighting component; the electronic noise cancellation device uses the same or similar connection mechanism as the lighting component for attaching to the overhead service component; and the noise cancellation device is configured to be connected to a power source that was utilized to power the lighting component.

In some embodiments, when installed in the overhead service component, the electronic noise cancellation device comprises a first obscured portion that extends above a bottom surface of the overhead service component and a second exposed portion that extends below the bottom surface of the overhead service component; the second exposed portion includes an opening that includes a microphone, the opening being positioned to receive ambient noise within a cabin of the aircraft; the second exposed portion further includes a speaker that is configured to output the noise cancellation signal; and the microphone and the speaker that are positioned approximately ninety degrees relative to each other.

In some embodiments, the first obscured portion of the electronic noise cancellation device is coupled to a power source; the first obscured portion of the electronic noise cancellation device includes at least one mechanical connector for coupling the electronic noise cancellation device to the lighting socket; and the second exposed portion includes a rotatable component, the rotatable component is adapted to adjust one or more settings of the one or more lighting components.

In some embodiments, the first obscured portion of the electronic noise cancellation device includes, or is in communication with, a processing device that generates the noise cancellation signal.

In some embodiments, one or more sensors are configured to monitor a noise-generating source; a noise cancellation function utilizes at least one tuning parameter derived from an output of the one or more sensors to generate the noise cancellation signal; the noise cancellation signal is adapted to cancel out noise generated by the noise-generating source within the aircraft enclosure; and the one or more audio output devices output the noise cancellation signal generated by the noise cancellation function.

In some embodiments, the noise-generating source is a mechanical component of the aircraft including at least one of: a turbo prop engine; or a propeller; and the one or more sensors positioned on or adjacent to the noise-generating source.

In some embodiments, the electronic noise cancellation device is pre-calibrated to detect and cancel prevalent frequency bands inside the aircraft in which the noise cancellation device is installed; during a calibration phase, frequency bands for the aircraft are monitored and the prevalent frequency bands are identified; and a noise cancellation function, which generates the noise cancellation signal, is preprogrammed to detect the prevalent frequency bands.

In some embodiments, the electronic noise cancellation device is in communication with a processing device that is configured to determine a frequency of ambient noise inside a cabin of the aircraft and generate the noise cancellation signal; and the one or more audio output devices are configured to output the noise cancellation signal, the noise cancelation signal is phase-inverted one hundred and eighty degrees relative to the ambient noise.

In some embodiments, a plurality of electronic noise cancellation devices are installed in the aircraft; a centralized processor is configured to communicate with each of the plurality of electronic noise cancellation devices; the centralized processor executes a noise cancellation function to generate the noise cancellation signal based, at least in part, on inputs received from the plurality of electronic noise cancellation devices; and the noise cancellation signal is output by each of the plurality of electronic noise cancellation devices.

In certain embodiments, an electronic noise cancellation system for an aircraft is provided. The electronic noise cancellation system comprises: an overhead service component included within an aircraft enclosure; at least one noise cancellation device configured to be installed in a lighting socket of the overhead service component, the at least one noise cancellation device comprising: one or more audio input devices that are configured to receive an input audio signal; one or more audio output devices configured to output a noise cancellation signal; one or more lighting components; and at least one connector that enables the electronic noise cancellation device to be coupled to an overhead service component of the aircraft; at least one processor that is coupled to the one or more audio input devices and the one or more audio output devices, the at least one processor being configured to execute a noise cancellation function that generates the noise cancellation signal.

In some embodiments, the noise cancellation device is adapted to replace a lighting component of the overhead service component and upgrade the overhead service component with noise cancellation functionalities; the noise cancellation device is sized to fit inside the lighting socket based on dimensions of the lighting component; the noise cancellation device uses the same or similar connection mechanism as the lighting component for attaching to the overhead service component; and the noise cancellation device is configured to be connected to a power source that was utilized to power the lighting component.

In some embodiments, when installed in the overhead service component, the noise cancellation device comprises a first obscured portion that extends above a bottom surface of the overhead service component and a second exposed portion that extends below the bottom surface of the overhead service component; the second exposed portion includes an opening that includes a microphone, the opening being positioned to receive ambient noise within a cabin of the aircraft; the second exposed portion further includes a speaker that is configured to output the noise cancellation signal; and the microphone and the speaker that are positioned approximately ninety degrees relative to each other.

In some embodiments, the first obscured portion of the noise cancellation device is coupled to a power source; the first obscured portion of the noise cancellation device includes at least one mechanical connector for coupling the noise cancellation device to the lighting socket; and the second exposed portion includes a rotatable component, the rotatable component is adapted to adjust one or more settings of the one or more lighting components.

In some embodiments, the first obscured portion of the noise cancellation device includes, or is in communication with, the processor that generates the noise cancellation signal.

In some embodiments, one or more sensors are configured to monitor a noise-generating source; a noise cancellation function utilizes at least one tuning parameter derived from an output of the one or more sensors to generate the noise cancellation signal; the noise cancellation signal is adapted to cancel out noise generated by the noise-generating source within the aircraft enclosure; the one or more audio output devices output the noise cancellation signal generated by the noise cancellation function; the noise-generating source is a mechanical component of the aircraft including at least one of: a turbo prop engine; or a propeller; and the one or more sensors are positioned on or adjacent to the noise-generating source.

In some embodiments, the noise cancellation device is pre-calibrated to detect and cancel prevalent frequency bands inside the aircraft in which the noise cancellation device is installed; during a calibration phase, frequency bands for the aircraft are monitored and the prevalent frequency bands are identified; and a noise cancellation function, which generates the noise cancellation signal, is preprogrammed to detect the prevalent frequency bands.

In some embodiments, the noise cancellation device is in communication with the processor that is configured to determine a frequency of ambient noise inside a cabin of the aircraft and generate the noise cancellation signal; and the one or more audio output devices are configured to output the noise cancellation signal, the noise cancelation signal is phase-inverted one hundred and eighty degrees relative to the ambient noise.

In some embodiments, a plurality of noise cancellation devices are installed in the aircraft; a centralized processor is configured to communicate with each of the plurality of noise cancellation devices; the centralized processor executes a noise cancellation function to generate the noise cancellation signal based, at least in part, on inputs received from the plurality of noise cancellation devices; and the noise cancellation signal is output by each of the plurality of noise cancellation devices.

In some embodiments, a method is provided. The method comprises: providing an electronic noise cancellation device for an aircraft, comprising a housing that integrates: (a) one or more audio input devices that are configured to receive an input audio signal; (b) one or more audio output devices configured to output a noise cancellation signal; (c) one or more lighting components; and (d) at least one connector that enables the electronic noise cancellation device to be coupled to an overhead service component of the aircraft, wherein the electronic noise cancellation device is adapted to be received in a lighting socket of the overhead service component included within an aircraft enclosure; installing the electronic noise cancellation device in the lighting socket of the overhead service component; and activating the electronic noise cancellation device to cancel in the aircraft enclosure.

In some embodiments, an electronic noise cancellation device for an aircraft is provided. The electronic noise cancellation device comprises: a housing that integrates: one or more audio input devices that are configured to receive an input audio signal; one or more audio output devices configured to output a noise cancellation signal; and one or more lighting components; wherein the electronic noise cancellation device is adapted to be received in a lighting socket of an overhead service component in an aircraft enclosure.

In some embodiments, an electronic noise cancellation device for an aircraft is provided. The electronic noise cancellation device comprises: a housing that integrates: one or more audio input devices that are configured to receive an input audio signal; one or more audio output devices configured to output a noise cancellation signal; and one or more lighting components; wherein the one or more audio input devices are arranged at an angle that is at least ninety degrees with respect to the one or more audio output devices.

In some embodiments, the noise cancellation signal is generated either by: 1) the electronic noise cancellation device itself; or 2) a centralized processing device in communication with the electronic noise cancellation device and one or more additional the electronic noise cancellation devices.

In some embodiments, the noise cancellation is generated in response to at least one of: 1) ambient noise detected in the input audio signal; and 2) tuning parameters generated by one or more sensors configured to monitor a noise-generating source.

In some embodiments, an electronic noise cancellation system for an aircraft is provided. The electronic noise cancellation system comprises: an enclosure; one or more audio input devices included within the enclosure that are configured to receive an input audio signal; one or more audio output devices included within the enclosure, the one or more audio output devices being configured to output a noise cancellation signal; and at least one processor that is coupled to the one or more audio input devices and the one or more audio output devices, the at least one processor being configured to execute a noise cancellation function; wherein: the noise cancellation function receives one or more tuning parameters associated with a noise-generating source; the noise-generating source generates ambient noise; the one or more tuning parameters indicate at least one of: a frequency or phase associated with the noise-generating source; the noise cancellation function utilizes the one or more tuning parameters to generate the noise cancellation signal, the noise cancellation signal being configured to at least partially cancel out the ambient noise generated by the noise-generating source; and the one or more audio output devices output the noise cancellation signal inside the enclosure.

In some embodiments, an electronic noise cancellation system for an aircraft is provided. The electronic noise cancellation system comprises: one or more audio input devices included inside of an aircraft enclosure, the one or more audio input devices being configured to receive an input audio signal; one or more audio output devices included within the aircraft enclosure, the one or more audio output devices being configured to output a noise cancellation signal; and at least one processor that is coupled to the one or more audio input devices and the one or more audio output devices, the at least one processor being configured to execute a noise cancellation function; wherein: the noise cancellation function receives one or more tuning parameters associated with a noise-generating source, the noise-generating source including one of: a propeller or an engine; the noise-generating source generates ambient noise; the one or more tuning parameters indicate at least one of: a frequency of the propeller or engine, or a phase of the propeller or engine; the noise cancellation function utilizes the one or more tuning parameters to generate the noise cancellation signal in a manner that at least partially cancels out the ambient noise within the aircraft enclosure; and the one or more audio output devices output the noise cancellation signal inside the enclosure.

In some embodiments, an electronic noise cancellation system for a vehicle is provided. The electronic noise cancellation system comprises: one or more audio input devices included inside of a vehicle enclosure, the one or more audio input devices being configured to receive an input audio signal; one or more audio output devices included within the vehicle enclosure, the one or more audio output devices being configured to output a noise cancellation signal; and at least one processor that is coupled to the one or more audio input devices and the one or more audio output devices, the at least one processor being configured to execute a noise cancellation function; wherein: the noise cancellation function receives one or more tuning parameters associated with a noise-generating source; the noise-generating source generates ambient noise; the one or more tuning parameters indicate at least one of: a frequency of the noise-generating source, or a phase of the noise-generating source; the noise cancellation function utilizes the one or more tuning parameters to generate the noise cancellation signal in a manner that at least partially cancels out the ambient noise within the vehicle enclosure; and the one or more audio output devices output the noise cancellation signal generated by the noise cancellation function.

In some embodiments, an electronic noise cancellation system is provided. The electronic noise cancellation system comprises: an enclosure; one or more audio input devices included within the enclosure that are configured to receive an input audio signal; one or more audio output devices included within the enclosure, the one or more audio output devices being configured to output a noise cancellation signal; and at least one processor that is coupled to the one or more audio input devices and the one or more audio output devices, the at least one processor being configured to execute a noise cancellation function; wherein: the noise cancellation function receives one or more tuning parameters associated with a noise-generating source; the noise-generating source generates ambient noise; the one or more tuning parameters indicate at least one of: a frequency or phase associated with the noise-generating source; the noise cancellation function utilizes the one or more tuning parameters to generate the noise cancellation signal, the noise cancellation signal being configured to at least partially cancel out the ambient noise generated by the noise-generating source; and the one or more audio output devices output the noise cancellation signal inside the enclosure.

Embodiments may include a computer program product accessible from a computer-usable or computer-readable medium providing program code for use by or in connection with a computer or any instruction execution system. The computer program product may store instructions for implementing the functionality of the electronic noise cancellation system 100 and/or other component described herein. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or storage devices through intervening private or public networks. Satellite transceivers, wireless transceivers, modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. An electronic noise cancellation device for an aircraft, comprising:
   a device housing that is adapted to be connected to a passenger service unit to retrofit the passenger service unit with noise cancellation functionalities, the device housing including a self-contained structure that is independent of a housing for the passenger service unit and which is dimensioned to be received in a preexisting lighting socket included on the housing of the passenger service unit;
   wherein the self-contained structure of the device housing encapsulates: (a) one or more audio input devices that are configured to receive an input audio signal; (b) one or more audio output devices configured to output a noise cancellation signal; and (c) one or more lighting components;
   wherein at least one connector is included on an end portion of the device housing and enables the electronic noise cancellation device to be coupled to the housing of the passenger service unit at a location of the preexisting lighting socket;
   wherein the electronic noise cancellation device is pre-calibrated to detect and cancel prevalent frequency bands inside the aircraft in which the electronic noise cancellation device is installed;
   wherein, during a calibration phase, frequency bands for the aircraft are monitored and the prevalent frequency bands are identified; and wherein a noise cancellation function, which generates the noise cancellation signal, is preprogrammed to detect the prevalent frequency bands.

2. The electronic noise cancellation device of claim 1, wherein:
the electronic noise cancellation device is adapted to replace a preexisting lighting component of the passenger service unit and upgrade the passenger service unit with the noise cancellation functionalities;
the device housing of the electronic noise cancellation device is sized to fit inside the preexisting lighting socket; and
the electronic noise cancellation device is configured to be connected to a power source that was utilized to power the preexisting lighting component.

3. The electronic noise cancellation device of claim 1, wherein:
when installed in the passenger service unit, the electronic noise cancellation device comprises a first obscured portion that extends above a bottom surface of the passenger service unit and a second exposed portion that extends below the bottom surface of the passenger service unit;
the second exposed portion includes an opening that includes a microphone, the opening being positioned to receive ambient noise within a cabin of the aircraft;
the second exposed portion further includes a speaker that is configured to output the noise cancellation signal; and
the microphone and the speaker are positioned approximately ninety degrees relative to each other.

4. The electronic noise cancellation device of claim 3, wherein:
the first obscured portion of the electronic noise cancellation device is coupled to a power source;
the first obscured portion of the electronic noise cancellation device includes at least one mechanical connector for coupling the electronic noise cancellation device to the preexisting lighting socket; and
the second exposed portion includes a rotatable component, the rotatable component is adapted to adjust one or more settings of the one or more lighting components.

5. The electronic noise cancellation device of claim 4, wherein the first obscured portion of the electronic noise cancellation device includes, or is in communication with, a processing device that generates the noise cancellation signal.

6. The electronic noise cancellation device of claim 1, wherein:
one or more sensors are configured to monitor a noise-generating source;
the noise cancellation function utilizes at least one tuning parameter derived from an output of the one or more sensors to generate the noise cancellation signal;
the noise cancellation signal is adapted to cancel out noise generated by the noise-generating source; and
the one or more audio output devices output the noise cancellation signal generated by the noise cancellation function.

7. The electronic noise cancellation device of claim 6, wherein:
the noise-generating source is a mechanical component of the aircraft including at least one of: a turbo prop engine; or a propeller; and
the one or more sensors are positioned on or adjacent to the noise-generating source.

8. The electronic noise cancellation device of claim 1, wherein:
the electronic noise cancellation device is in communication with a processing device that is configured to determine a frequency of ambient noise inside a cabin of the aircraft and generate the noise cancellation signal; and
the one or more audio output devices are configured to output the noise cancellation signal, the noise cancellation signal is phase-inverted one hundred and eighty degrees relative to the ambient noise.

9. The electronic noise cancellation device of claim 1, wherein:
a centralized processor is configured to communicate with the electronic noise cancellation device and a plurality of additional electronic noise cancellation devices;
the centralized processor executes the noise cancellation function to generate the noise cancellation signal based, at least in part, on inputs received from the electronic noise cancellation device and the plurality of additional electronic noise cancellation devices; and
the noise cancellation signal is output by the electronic noise cancellation device and each of the plurality of additional electronic noise cancellation devices.

10. An electronic noise cancellation system for an aircraft, comprising:
a passenger service unit included within an aircraft enclosure, the passenger service unit comprising a preexisting lighting socket;
at least one noise cancellation device configured to be installed in the preexisting lighting socket of the passenger service unit to retrofit the passenger service unit with noise cancellation functionalities, wherein:
the at least one noise cancellation device comprises a self-contained device housing that is independent of a housing for the passenger service unit and which is dimensioned to be received in the preexisting lighting socket included on the housing of the passenger service unit;
the self-contained device housing encapsulates: (a) one or more audio input devices that are configured to receive an input audio signal; (b) one or more audio output devices configured to output a noise cancellation signal; and (c) one or more lighting components; and
at least one connector is included on an end portion of the self-contained device housing and enables the at least one noise cancellation device to be coupled to the housing of the passenger service unit at a location of the preexisting lighting socket;
the at least one noise cancellation device is pre-calibrated to detect and cancel prevalent frequency bands inside the aircraft in which the at least one noise cancellation device is installed;
during a calibration phase, frequency bands for the aircraft are monitored and the prevalent frequency bands are identified; and
a noise cancellation function, which generates the noise cancellation signal, is preprogrammed to detect the prevalent frequency bands;
at least one processor that is coupled to the one or more audio input devices and the one or more audio output devices, the at least one processor being configured to execute the noise cancellation function that generates the noise cancellation signal.

11. The electronic noise cancellation system of claim 10, wherein:

the at least one noise cancellation device is adapted to replace a preexisting lighting component of the passenger service unit and upgrade the passenger service unit with the noise cancellation functionalities;

the at least one noise cancellation device is sized to fit inside the preexisting lighting socket; and the at least one noise cancellation device is configured to be connected to a power source that was utilized to power the preexisting lighting component.

12. The electronic noise cancellation system of claim 10, wherein:

when installed in the passenger service unit, the at least one noise cancellation device comprises a first obscured portion that extends above a bottom surface of the passenger service unit and a second exposed portion that extends below the bottom surface of the passenger service unit;

the second exposed portion includes an opening that includes a microphone, the opening being positioned to receive ambient noise within a cabin of the aircraft;

the second exposed portion further includes a speaker that is configured to output the noise cancellation signal; and the microphone and the speaker that are positioned approximately ninety degrees relative to each other.

13. The electronic noise cancellation system of claim 12, wherein:

the first obscured portion of the at least one noise cancellation device is coupled to a power source;

the first obscured portion of the at least one noise cancellation device includes at least one mechanical connector for coupling the at least one noise cancellation device to the preexisting lighting socket; and the second exposed portion includes a rotatable component, the rotatable component is adapted to adjust one or more settings of the one or more lighting components.

14. The electronic noise cancellation system of claim 13, wherein the first obscured portion of the at least one noise cancellation device includes, or is in communication with, the at least one processor that generates the noise cancellation signal.

15. The electronic noise cancellation system of claim 10, wherein:

one or more sensors are configured to monitor a noise-generating source;

the noise cancellation function utilizes at least one tuning parameter derived from an output of the one or more sensors to generate the noise cancellation signal;

the noise cancellation signal is adapted to cancel out noise generated by the noise-generating source within the aircraft enclosure;

the one or more audio output devices output the noise cancellation signal generated by the noise cancellation function;

the noise-generating source is a mechanical component of the aircraft including at least one of: a turbo prop engine; or a propeller; and the one or more sensors are positioned on or adjacent to the noise-generating source.

16. The electronic noise cancellation system of claim 10, wherein:

the at least one noise cancellation device is in communication with the at least one processor that is configured to determine a frequency of ambient noise inside a cabin of the aircraft and generate the noise cancellation signal; and the one or more audio output devices are configured to output the noise cancellation signal, the noise cancellation signal is phase-inverted one hundred and eighty degrees relative to the ambient noise.

17. The electronic noise cancellation system of claim 10, wherein:

a centralized processor is configured to communicate with the at least one noise cancellation device and a plurality of additional noise cancellation devices;

the centralized processor executes the noise cancellation function to generate the noise cancellation signal based, at least in part, on inputs received from the at least one noise cancellation device and the plurality of additional noise cancellation devices; and the noise cancellation signal is output by the at least one noise cancellation device and each of the plurality of additional noise cancellation devices.

18. A method comprising:

providing an electronic noise cancellation device that is adapted to be coupled to a housing of a passenger service unit in an aircraft, the electronic noise cancellation device comprising a self-contained device housing that is independent of a housing for the passenger service unit and which is dimensioned to be received in a preexisting lighting socket included on the housing of the passenger service unit, wherein the self-contained device housing incorporates: (a) one or more audio input devices that are configured to receive an input audio signal; (b) one or more audio output devices configured to output a noise cancellation signal; (c) one or more lighting components; and (d) at least one connector included on an end portion of the self-contained device housing that enables the electronic noise cancellation device to be coupled to the housing of the passenger service unit at a location of the preexisting lighting socket;

installing the electronic noise cancellation device in the preexisting lighting socket of the passenger service unit to retrofit the passenger service unit with noise cancellation functionalities; and activating the electronic noise cancellation device to cancel noise in an aircraft enclosure of the aircraft;

wherein the electronic noise cancellation device is pre-calibrated to detect and cancel prevalent frequency bands inside the aircraft in which the electronic noise cancellation device is installed;

wherein, during a calibration phase, frequency bands for the aircraft are monitored and the prevalent frequency bands are identified; and wherein a noise cancellation function, which generates the noise cancellation signal, is preprogrammed to detect the prevalent frequency bands.

19. An electronic noise cancellation device for an aircraft, comprising:

a device housing that is adapted to be connected to a passenger service unit to retrofit the passenger service unit with noise cancellation functionalities, the device housing including a self-contained structure that is independent of a housing for the passenger service unit and which is dimensioned to be received in a preexisting lighting socket included on the housing of the passenger service unit;

wherein the self-contained structure of the device housing encapsulates: (a) one or more audio input devices that are configured to receive an input audio signal; (b) one or more audio output devices configured to output a noise cancellation signal; and (c) one or more lighting components;

wherein at least one connector is included on an end portion of the device housing and enables the electronic noise cancellation device to be coupled to the housing of the passenger service unit at a location of the preexisting lighting socket;

wherein, when installed in the passenger service unit, the electronic noise cancellation device comprises a first obscured portion that extends above a bottom surface of the passenger service unit and a second exposed portion that extends below the bottom surface of the passenger service unit;

wherein the second exposed portion includes an opening that includes a microphone, the opening being positioned to receive ambient noise within a cabin of the aircraft;

wherein the second exposed portion further includes a speaker that is configured to output the noise cancellation signal; and wherein the microphone and the speaker are positioned approximately ninety degrees relative to each other.

20. An electronic noise cancellation device for an aircraft, comprising:

a device housing that is adapted to be connected to a passenger service unit to retrofit the passenger service unit with noise cancellation functionalities, the device housing including a self-contained structure that is independent of a housing for the passenger service unit and which is dimensioned to be received in a preexisting lighting socket included on the housing of the passenger service unit;

wherein the self-contained structure of the device housing encapsulates: (a) one or more audio input devices that are configured to receive an input audio signal; (b) one or more audio output devices configured to output a noise cancellation signal; and (c) one or more lighting components;

wherein at least one connector is included on an end portion of the device housing and enables the electronic noise cancellation device to be coupled to the housing of the passenger service unit at a location of the preexisting lighting socket;

wherein one or more sensors are configured to monitor a noise-generating source;

wherein a noise cancellation function utilizes at least one tuning parameter derived from an output of the one or more sensors to generate the noise cancellation signal;

wherein the noise cancellation signal is adapted to cancel out noise generated by the noise-generating source;

wherein the one or more audio output devices output the noise cancellation signal generated by the noise cancellation function;

wherein the noise-generating source is a mechanical component of the aircraft including at least one of: a turbo prop engine; or a propeller; and wherein the one or more sensors are positioned on or adjacent to the noise-generating source.

21. An electronic noise cancellation device for an aircraft, comprising:

a device housing that is adapted to be connected to a passenger service unit to retrofit the passenger service unit with noise cancellation functionalities, the device housing including a self-contained structure that is independent of a housing for the passenger service unit and which is dimensioned to be received in a preexisting lighting socket included on the housing of the passenger service unit;

wherein the self-contained structure of the device housing encapsulates: (a) one or more audio input devices that are configured to receive an input audio signal; (b) one or more audio output devices configured to output a noise cancellation signal; and (c) one or more lighting components;

wherein at least one connector is included on an end portion of the device housing and enables the electronic noise cancellation device to be coupled to the housing of the passenger service unit at a location of the preexisting lighting socket;

wherein a centralized processor is configured to communicate with the electronic noise cancellation device and a plurality of additional electronic noise cancellation devices;

wherein the centralized processor executes a noise cancellation function to generate the noise cancellation signal based, at least in part, on inputs received from the electronic noise cancellation device and the plurality of additional electronic noise cancellation devices; and wherein the noise cancellation signal is output by the electronic noise cancellation device and each of the plurality of additional electronic noise cancellation devices.

* * * * *